(12) United States Patent
Zeng

(10) Patent No.: US 12,534,333 B2
(45) Date of Patent: Jan. 27, 2026

(54) ELECTRIC VEHICLE CHARGER WITH RETRACTABLE WIRE

(71) Applicant: Dongguan Yingsheng Intelligent Technology Co., Ltd, Dongguan (CN)

(72) Inventor: Chunxu Zeng, Dongguan (CN)

(73) Assignee: Dongguan Yingsheng Intelligent Technology Co., Ltd, Dongguan (CN)

( * ) Notice: Subject to any disclaimer, the term of this patent is extended or adjusted under 35 U.S.C. 154(b) by 865 days.

(21) Appl. No.: 17/855,815

(22) Filed: Jul. 1, 2022

(65) Prior Publication Data

US 2022/0402723 A1    Dec. 22, 2022

(30) Foreign Application Priority Data

Apr. 20, 2022 (CN) .......................... 202220912053.0

(51) Int. Cl.
| | |
|---|---|
| H02J 7/00 | (2006.01) |
| B60L 53/18 | (2019.01) |
| B60L 53/30 | (2019.01) |
| B65H 75/44 | (2006.01) |
| B65H 75/48 | (2006.01) |
| H02G 11/02 | (2006.01) |
| H05K 5/02 | (2006.01) |

(52) U.S. Cl.
CPC .......... *B65H 75/4434* (2013.01); *B60L 53/18* (2019.02); *B60L 53/30* (2019.02); *B65H 75/486* (2013.01); *H02G 11/02* (2013.01); *H05K 5/0217* (2013.01); *B65H 2701/34* (2013.01)

(58) Field of Classification Search
None
See application file for complete search history.

(56) References Cited

U.S. PATENT DOCUMENTS

| | | | |
|---|---|---|---|
| 2015/0015202 A1 | 1/2015 | Im et al. | |
| 2016/0121747 A1* | 5/2016 | Jefferies | .................. B60L 53/16 320/109 |
| 2019/0232794 A1 | 8/2019 | Sparks | |
| 2021/0008987 A1 | 1/2021 | Vahedi et al. | |

* cited by examiner

*Primary Examiner* — Arun C Williams
(74) *Attorney, Agent, or Firm* — Zhigang Ma

(57) ABSTRACT

The utility model patent discloses an electric vehicle charger with a retractable wire. The electric vehicle charger includes a storage box, a winding wheel and a wire; one end of the wire is connected with the charger; the winding wheel is mounted in the storage box; a coil spring and a sliding ring are provided in the winding wheel; and the sliding ring has a conducting ring and a conducting strip. When the winding wheel is rotated, the conducting strip rotate synchronously with the winding wheel; and furthermore, when the conducting strip slides on an outer surface of the conducting ring, the conducting strip and the conducting ring are kept in electric contact. The electric vehicle charger further includes a pull-stop structure; the pull-stop structure includes a limiting gear and a latch; the latch selectively limits the limiting gear; and the limiting gear is an incomplete gear.

7 Claims, 10 Drawing Sheets

ELECTRIC VEHICLE CHARGER WITH RETRACTABLE WIRE

TECHNICAL FIELD

The utility model patent relates to the field of electric vehicle chargers, particularly to electric vehicle charger with a retractable wire.

BACKGROUND

With the development of electric vehicles, more and more electric vehicle chargers appear in charging piles and some ordinary families. However, wires of some existing electric vehicle chargers are still collected manually. As such, there is a problem of inconvenience in use. Of course, there are also some electric vehicle charger wire reel in the market, but these wire reels also have the problem about wire heat dissipation.

Therefore, it is necessary to study a new technical solution to solve the above problems.

SUMMARY

In order to solve the defects and shortcomings in the prior art, the utility model patent provides electric vehicle charger with a retractable wire. A sliding ring is arranged in a winding wheel of a charger, so that the problem that the wire is easy to break in the rotating process of the winding wheel is solved. Meanwhile, by arrangement of a pull-stop structure, the user can pull out the wire according to an actual need and stop the pulling action at a corresponding position, so that the use operation of the user is greatly facilitated.

In order to achieve the above objective, the utility model patent adopts the following technical solution: Electric vehicle charger with a retractable wire includes a storage box, a winding wheel and a wire; one end of the wire is connected with the charger; the winding wheel is mounted in the storage box; a coil spring and a sliding ring are provided in the winding wheel; the sliding ring is provided with several conducting rings and several conducting strips that correspond and are electrically connected to the conducting rings; during use, a mains supply is connected to the conducting rings, and the wire is connected to the conducting strips; when the winding wheel is rotated, the conducting strips rotate synchronously with the winding wheel; and when the conducting strips slide on outer surfaces of the conducting rings, the conducting strips and the conducting rings are kept in electric contact.

The electric vehicle charger further includes a pull-stop structure; the pull-stop structure includes a limiting gear arranged on the winding wheel and a latch mounted on the storage box; the latch selectively limits the limiting gear; and the limiting gear is an incomplete gear.

As a preferable solution, a pair of side surfaces of the storage box are respectively correspondingly provided with a charger fetching hole and a ventilating hole.

As a preferable solution, the sliding ring includes a stator part and a rotor part; the conducting rings are arranged at the stator part; and the conducting strips are arranged at the rotor part.

As a preferable solution, the stator part is provided with a wire passing slot; and the wire passing slot is provided with an opening on an outer side for allowing the mains supply to enter.

As a preferable solution, there are five conducting rings, and correspondingly, there are also five conducting strips.

Or, there are seven conducting rings, and correspondingly, there are also seven conducting strips.

As a preferable solution, the latch is connected to the storage box through an elastic member.

As a preferable solution, the elastic member is a spring.

As a preferable solution, a circuit board is also arranged in the storage box; and the circuit board is arranged on an upper side of the winding wheel.

As a preferable solution, the circuit board is electrically connected with a display module.

As a preferable solution, a power management module is arranged on the circuit board.

Compared with the prior art, the utility model patent has obvious advantages and beneficial effects. Specifically, it can be mainly known from the above technical solutions that the sliding ring is arranged in the winding wheel of the charger, so that the problem that the wire is easy to break in the rotating process of the winding wheel is solved. Meanwhile, by the arrangement of the pull-stop structure, a user can pull out the wire according to an actual need and stop the pulling action at a corresponding position, so that the use operation of the user is greatly facilitated.

Secondly, the side corresponding to the charger fetching hole is provided with the ventilating hole to form a convection air duct, so that heat dissipation of the wire of the charger can be effectively guaranteed.

In order to describe the structural features and effects of the utility model patent more clearly, the utility model patent is described in detail below in combination with the accompanying drawings and specific embodiments.

REFERENCE SIGNS IN THE DRAWINGS

10: storage box; 11: charger fetching hole; 12: ventilating hole; 20: winding wheel; 21: coil spring; 22: sliding ring; 221: conducting ring; 222: conducting strip; 223: stator part; 2231: wire passing slot; 224: rotor part; 30: charger; 41: limiting gear; 42: latch; 421: elastic member; 51: cable; 52: wire; 60: circuit board; 70: display module.

DETAILED DESCRIPTION OF THE EMBODIMENTS

The technical solutions in the embodiments of the utility model patent will be clearly and completely described below in conjunction with the accompanying drawings. Apparently, the described embodiments are only preferred embodiments of the utility model patent.

It should be noted that when an element is referred to as being "fixed" to another element, it can be directly on the other element or an intermediate element may also exist. When an element is considered to be "connected" to another element, it can be directly connected to the other element or an intermediate element may be present at the same time. The terms "perpendicular", "horizontal", "left", "right" and similar expressions used herein are for illustrative purposes only, and are not meant to be the only implementation modes.

Unless otherwise defined, all technical and scientific terms used herein are the same as meanings of general understandings of those skilled in the art of the disclosure. The terms used in the description of the utility model patent herein are merely to describe the specific implementation modes, not intended to limit the utility model patent. The term "and/or" used herein includes any and all combinations of one or more related listed items.

Figure 1:
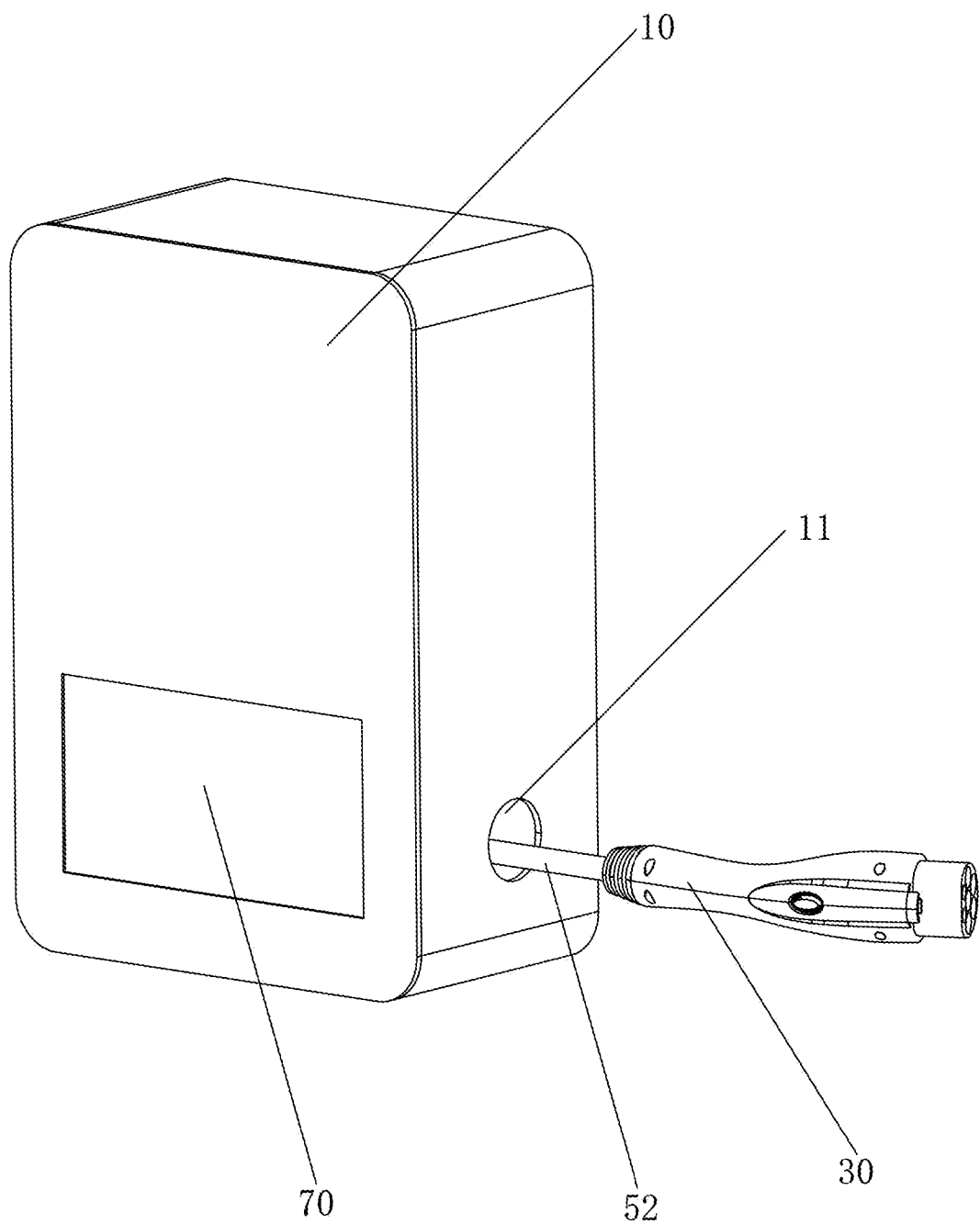
FIG. 1 is a schematic three-dimensional diagram of an embodiment of the utility model patent.
Figure 2:
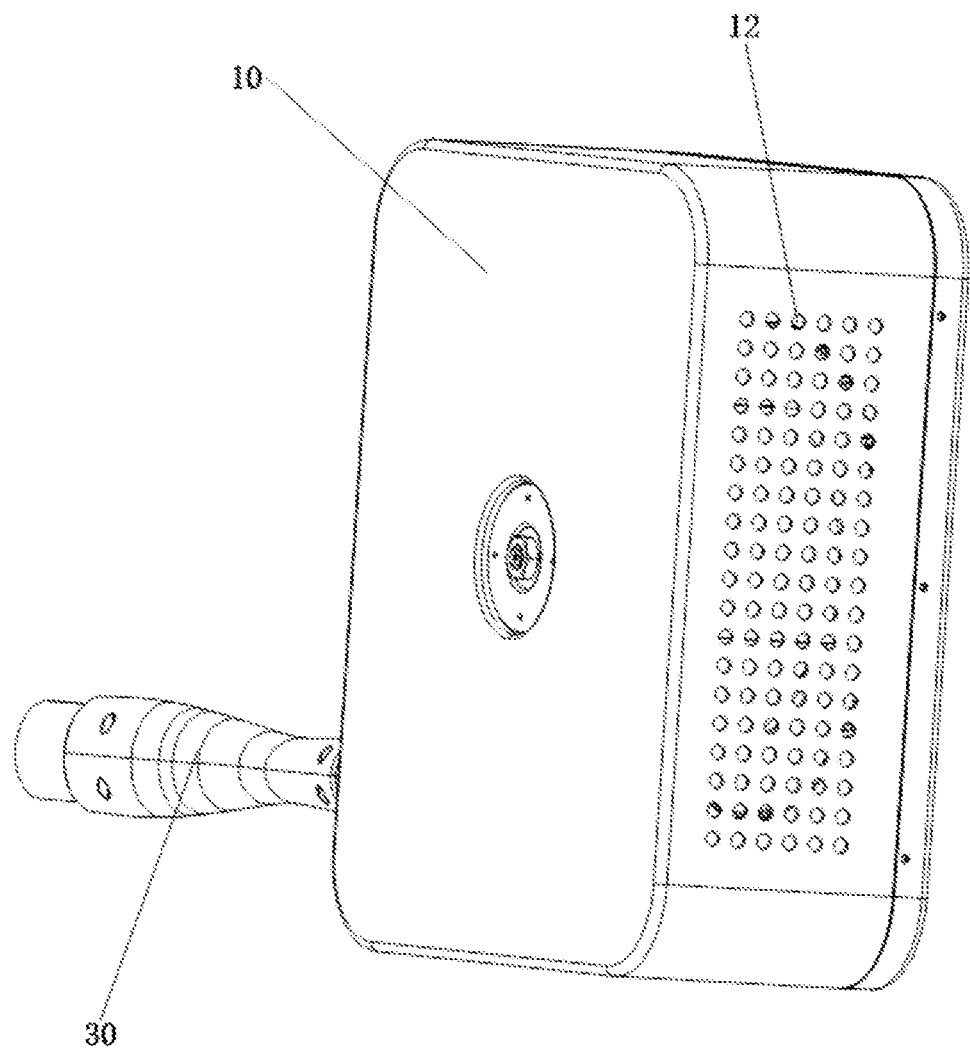
FIG. 2 is a schematic three-dimensional diagram of an embodiment of the utility model patent in another angle.
Figure 3:
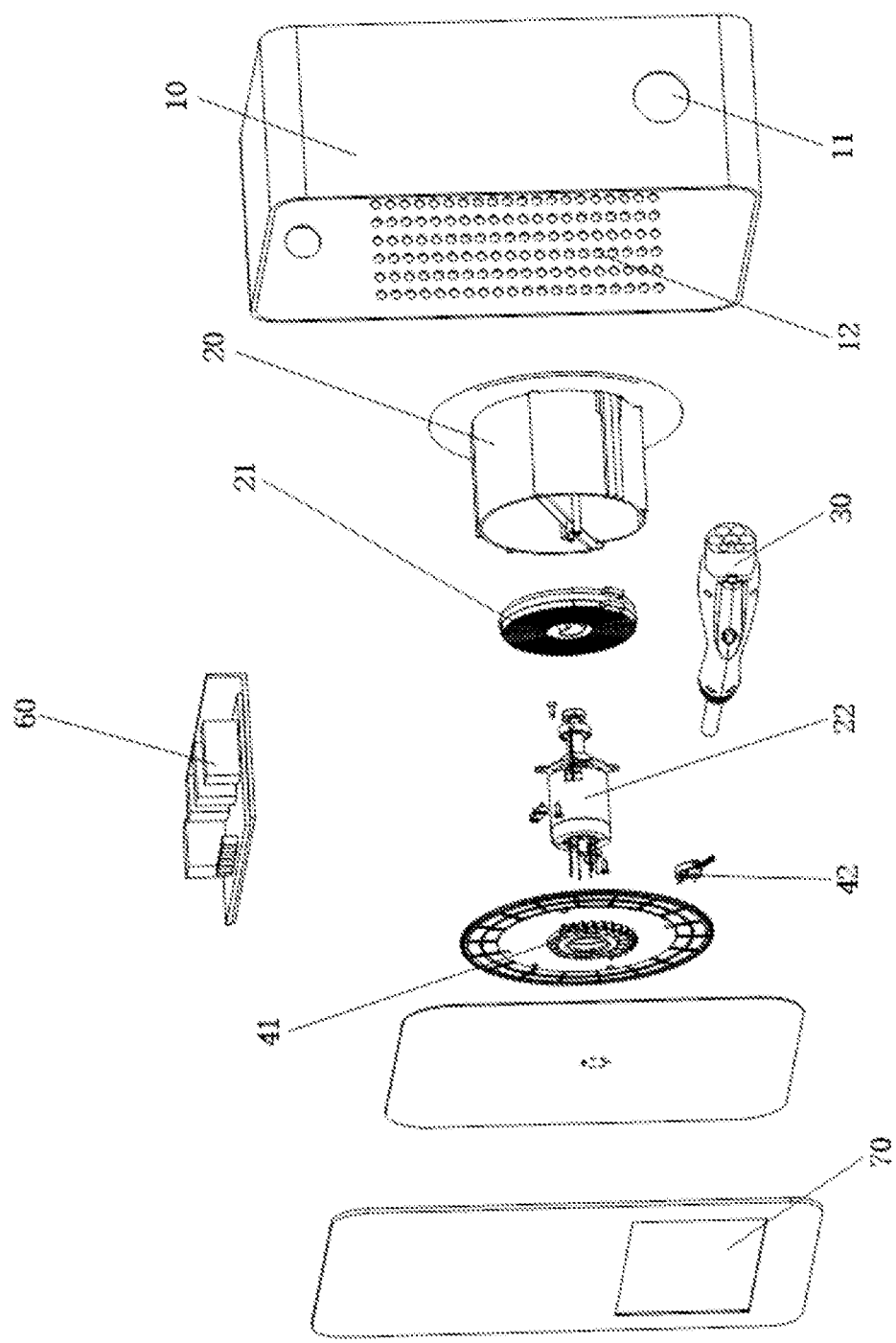
FIG. 3 is a schematic exploded diagram of an embodiment of the utility model patent.
Figure 4:
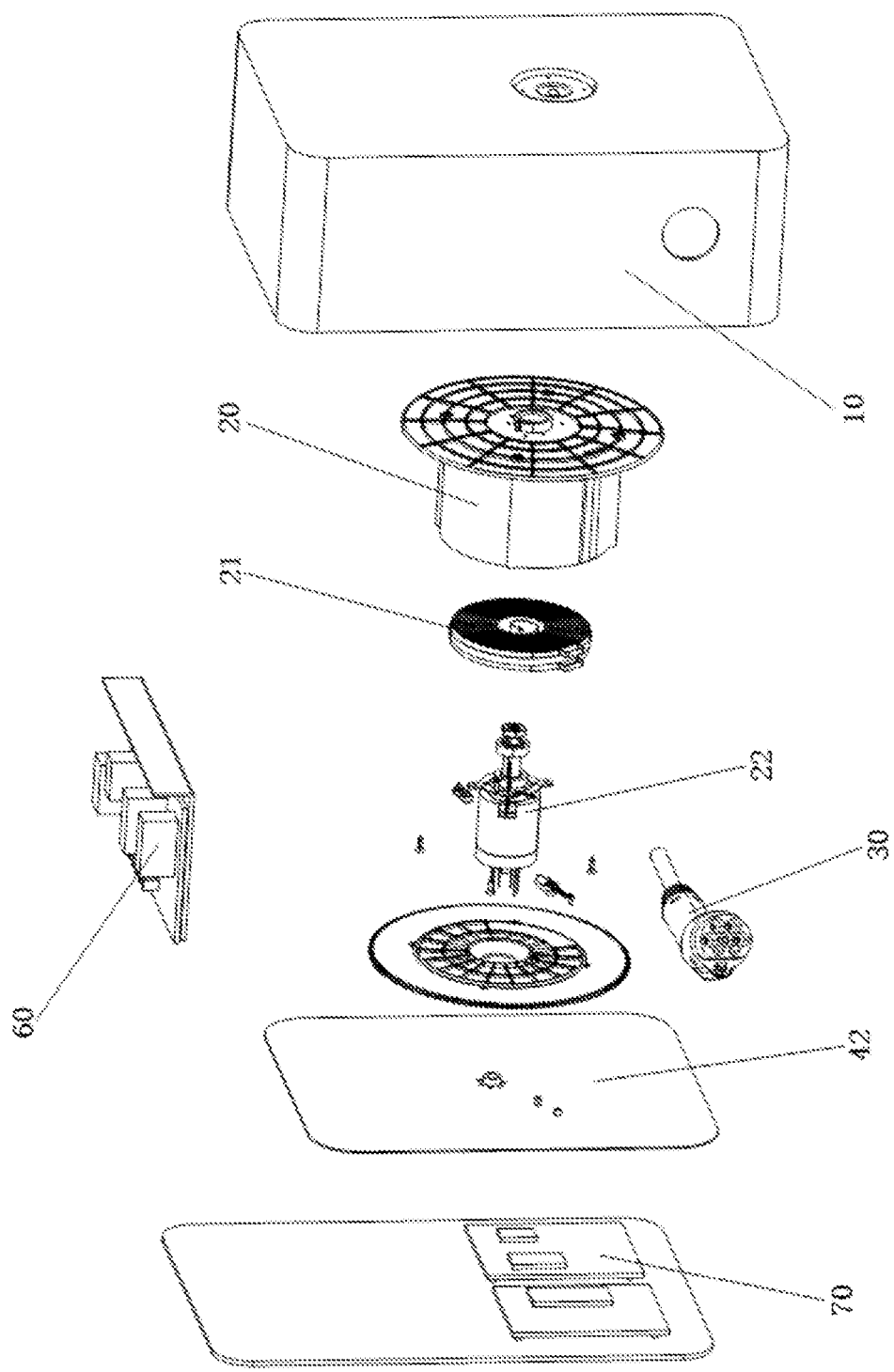
FIG. 4 is a schematic exploded diagram of an embodiment of the utility model patent in another angle.
Figure 5:
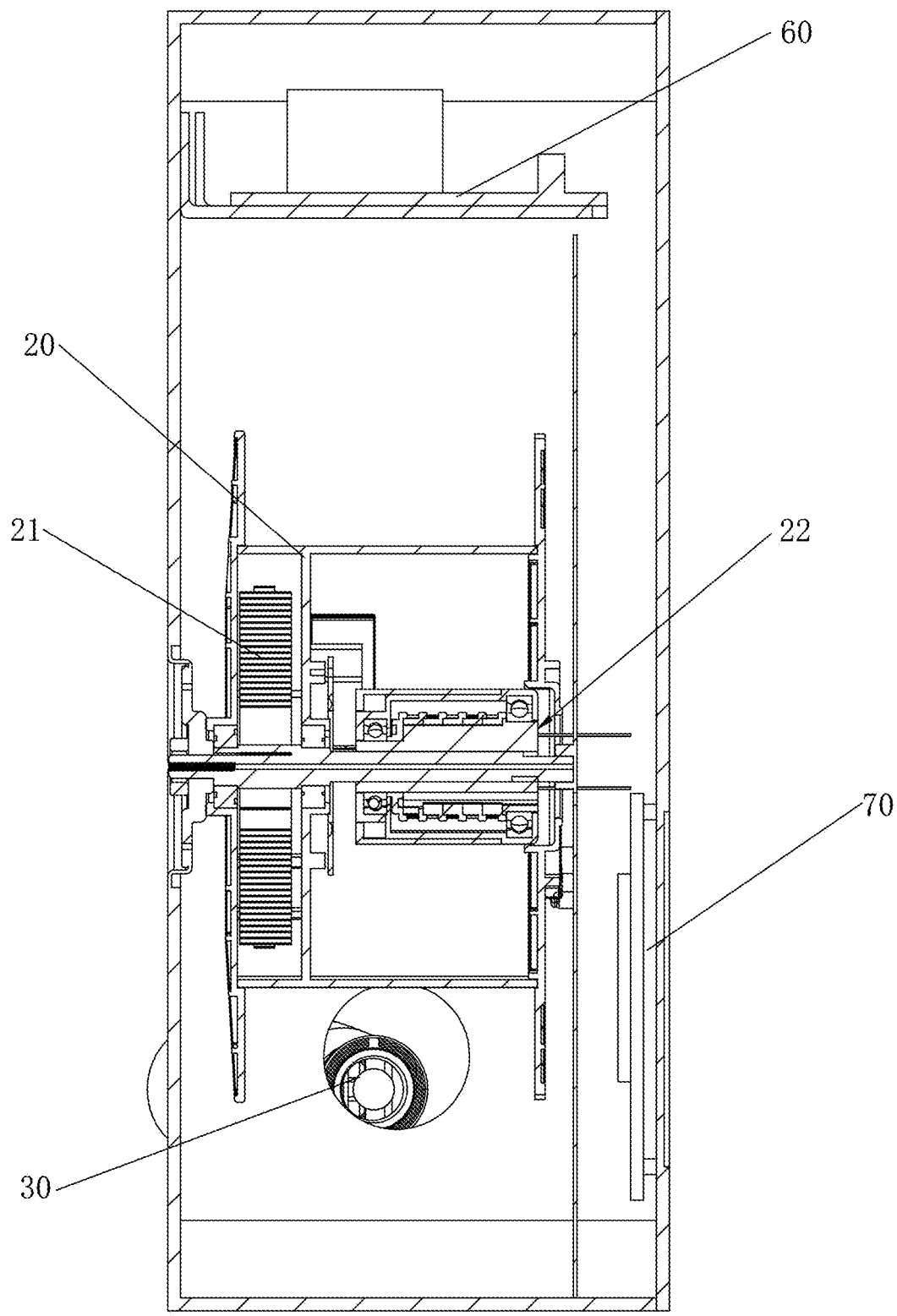
FIG. 5 is a schematic sectional diagram of an embodiment of the utility model patent.
Figure 6:
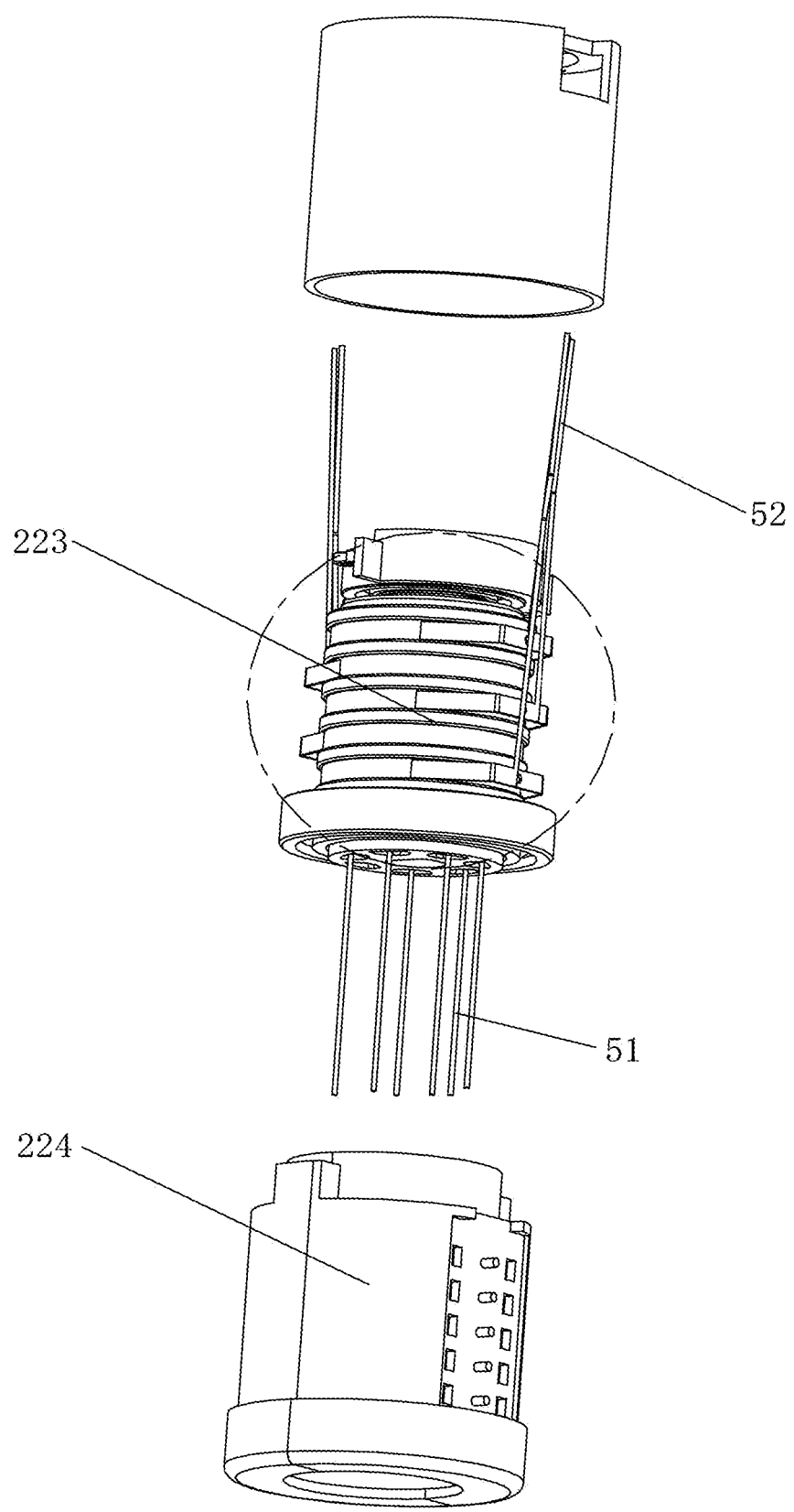
FIG. 6 is a schematic exploded diagram of a sliding ring in an embodiment of the utility model patent.
Figure 7:
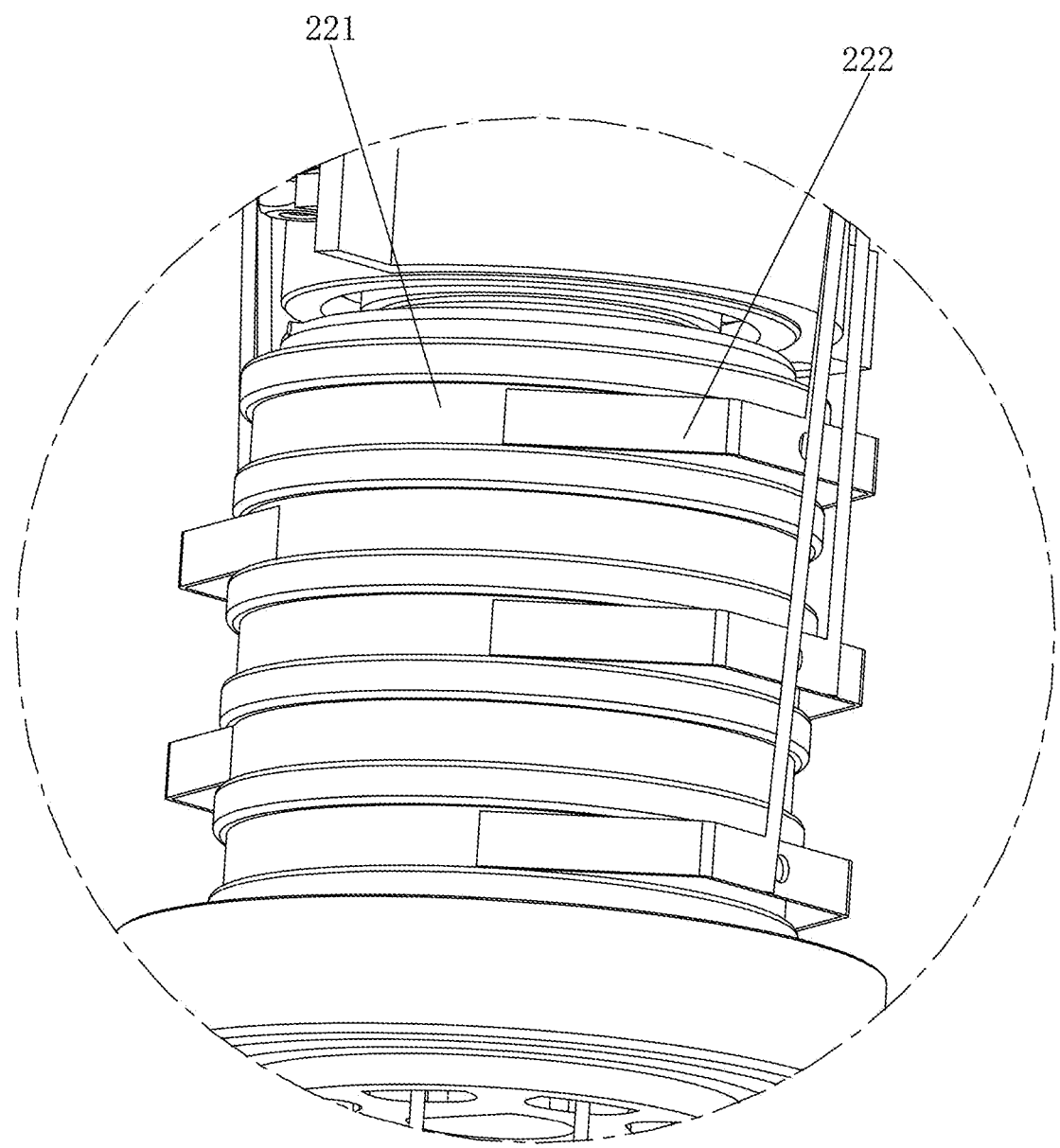
FIG. 7 is a partially enlarged diagram of FIG. 6.
Figure 8:
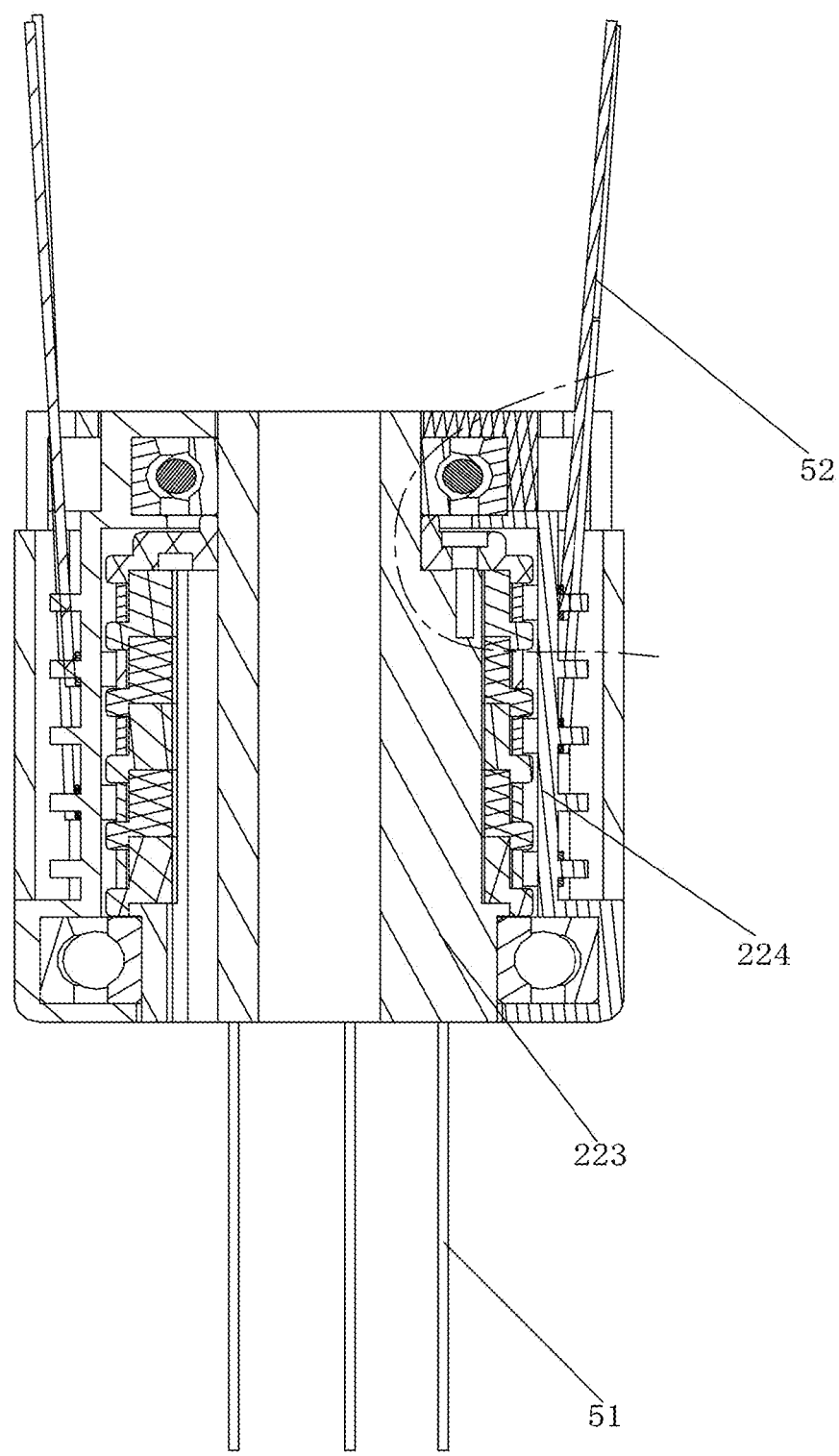
FIG. 8 is a schematic sectional diagram of the sliding ring in the embodiment of the utility model patent.
Figure 9:
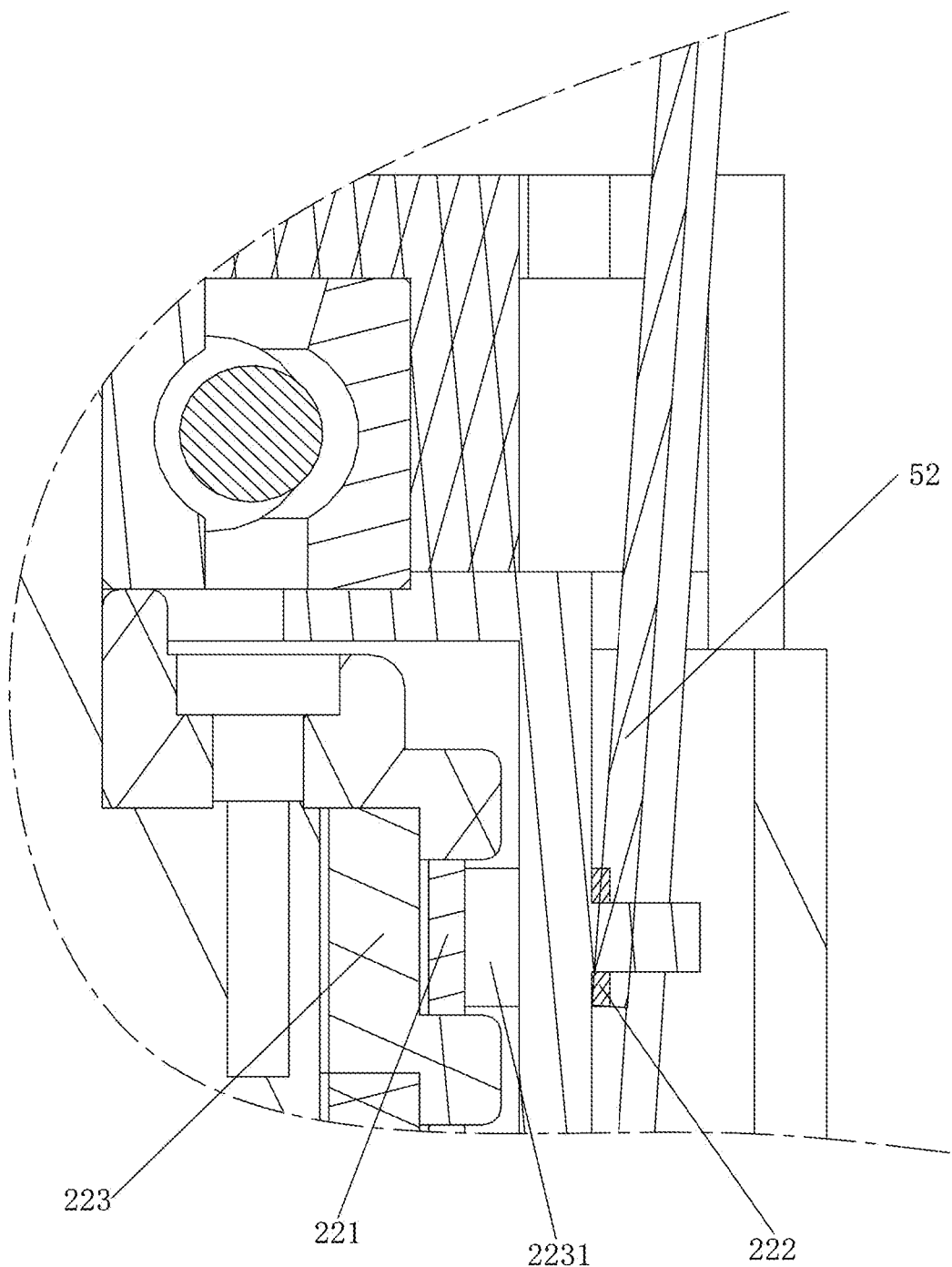
FIG. 9 is a partially enlarged diagram of FIG. 8.
Figure 10:
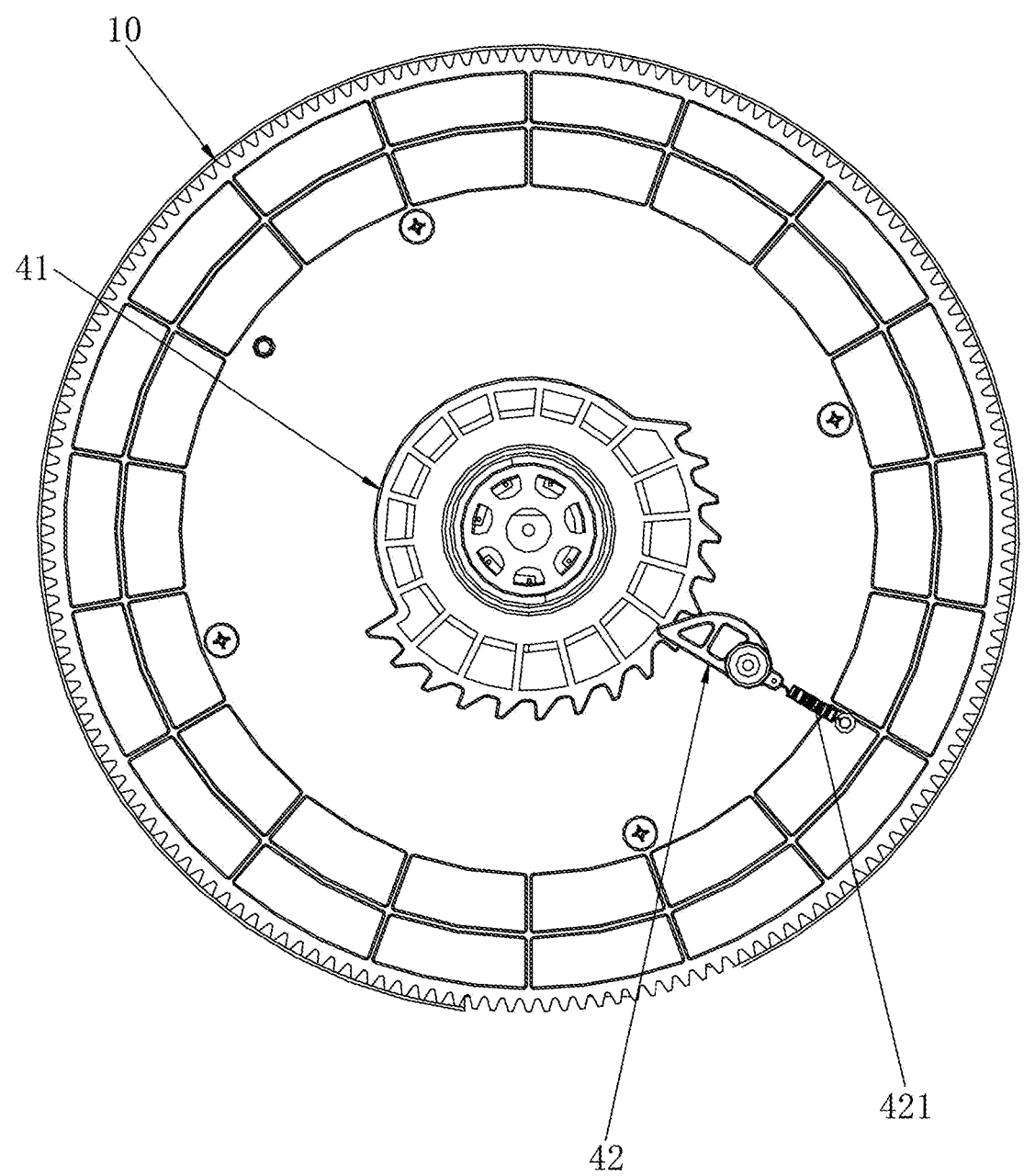
FIG. 10 is a partially exploded diagram of an embodiment of the utility model patent.

Referring to FIG. 1 to FIG. 10, electric vehicle charger with a retractable wire in an embodiment of the utility model patent includes a storage box 10, a winding wheel 20 and a wire 52; one end of the wire 52 is connected with the charger 30; the winding wheel 20 is mounted in the storage box 10; a coil spring 21 and a sliding ring 22 are provided in the winding wheel 20; the sliding ring 22 is provided with several conducting rings 221 and several conducting strips 222 that correspond and are electrically connected to the conducting rings 221; during use, a mains supply is connected to the conducting rings 221, and the wire 52 is connected to the conducting strips 222; when the winding wheel 20 is rotated, the conducting strips 222 rotate synchronously with the winding wheel 20; and when the conducting strips 222 slide on outer surfaces of the conducting rings 221, the conducting strips and the conducting rings are kept in electric contact.

The electric vehicle charger further includes a pull-stop structure; the pull-stop structure includes a limiting gear 41 arranged on the winding wheel 20 and a latch 42 mounted on the storage box 10; the latch 42 selectively limits the limiting gear 41; and the limiting gear 41 is an incomplete gear.

As such, the sliding ring 22 is arranged in the winding wheel 20 of the charger 30, so that the problem that the wire 52 is easy to break in the rotating process of the winding wheel 20 is solved. Meanwhile, by the arrangement of the pull-stop structure, a user can pull out the wire 52 according to an actual need and stop the pulling action at a corresponding position, so that the use operation of the user is greatly facilitated.

Further, a pair of side surfaces of the storage box 10 are respectively correspondingly provided with a charger fetching hole 11 and a ventilating hole 12. Specifically, referring to the figures, the charger fetching hole 11 is formed in a right side surface of the storage box 10; the ventilating hole 12 is formed in a left side surface of the storage box 10. As such, through holes are formed in one pair of side surfaces of the storage box 10 to form a convection air duct, which greatly increases the air flowing speed in the storage box 10, thus improving the heat dissipation efficiency in the storage box 10, facilitating the heat dissipation of the wire 52, and improving the use safety. Meanwhile, the ventilating hole 12 includes several small ventilating holes, so that a dustproof effect is also achieved.

Specifically, the sliding ring 22 includes a stator part 223 and a rotor part 224; the rotor part 224 is disposed relative to the stator part 223 in a manner of rotating around the stator part 223; the conducting rings 221 are arranged at the stator part 223; and the conducting strips 222 are arranged at the rotor part 224. The following is added: A special cable 51 is usually configured on the mains supply for the charger 30. The cable 51 is provided with several cells; and each cell is connected with one conducting ring 221. Similarly, the wire 52 of the charger 30 is also provided with corresponding several cells (the number of which is the same as the number of the cells of the cable 51), and each cell is connected with one conducting strip 222. As such, when the rotor part 224 rotates relative to the stator part 223, the conducting strips 222 are always in contact with outer side surfaces of the conducting rings 221 to achieve that the cable 51 of the mains supply is kept in electric contact with the wire 52 of the charger 30. The problem of breakage of a lead wire is avoided as well. It should be noted that the rotor part 224 is provided with corresponding avoiding holes corresponding to the conducting strips 222, so that the conducting strips 222 are connected to the conducting rings 221. The stator part 223 is provided with a wire passing slot 2231; and the wire passing slot 2231 is provided with an opening on an outer side for allowing the mains supply (the cells of the cable 51) to enter. Usually, the wire 52 connected to the charger 30 has five or seven cells, so that there may be five conducting rings 221, and correspondingly, there are also five conducting strips 222. Or, there may be seven conducting rings 221, and correspondingly, there are also seven conducting strips 222.

Further, the latch 42 is connected to the storage box 10 through an elastic member 421. The elastic member 421 may be a spring. During limitation, the latch 42 is located between two adjacent teeth of the limiting gear 41. During application, the charger 30 is pulled out; the winding wheel 20 drives the limiting gear 41 to clockwise rotate; and when the rotation stops, the latch 42 is located between two teeth of the limiting gear 41 to achieve self-locking. During take-up, the wire is continued to be pulled a certain distance, so that: the latch 42 stays at a part of the limiting gear 41 that is not provided with a teeth; and at this time, under the action of the coil spring, the winding wheel 20 drives the limiting gear 41 to reversely rotate to complete storage of the wire of the charger 30. This is the prior art, and descriptions thereof are omitted.

Further, the electric vehicle charger further includes a circuit board 60. A power management module is arranged on the circuit board 60. The power management module can manage the magnitude of an output current of the charger. Usually, the output current ranges from 8 A to 32 A.

In addition, the circuit board 60 is electrically connected with a display module 70. The display module 70 may be a light-emitting diode (LED) display module. The display module 70 is preferably arranged on the front side surface of the storage box 10.

Preferably, the circuit board 60 is arranged on an upper side of the winding wheel 20. A temperature control protection module is also arranged on the circuit board 60. When a temperature of the wire 52 exceeds a safe temperature value (such as 85° C.), the electric vehicle charger automatically stops charging.

Preferably, the circuit board 60 can also be provided with a card reader module or a card plugging module. The card reader module or the card plugging module has an integrated circuit (IC) reading unit, and a user can conduct a charging service through a corresponding IC card.

Preferably, the circuit board 60 can also be provided with a wireless communication module. The wireless communication module may be a Bluetooth module connected to a mobile phone.

Further, the display module 70 may display a real-time voltage and current of each phase of a three-phase supply, and the trouble of a traditional way in which the above data can only be read through a mobile phone APP is eliminated.

The design point of the utility model patent is mainly as follows: The sliding ring is arranged in the winding wheel of the charger, so that the problem that the wire is easy to break in the rotating process of the winding wheel is solved. Meanwhile, by the arrangement of the pull-stop structure, a user can pull out the wire according to an actual need and stop the pulling action at a corresponding position, so that the use operation of the user is greatly facilitated.

Secondly, the side corresponding to the charger fetching hole is provided with the ventilating hole to form a convection air duct, so that heat dissipation of the wire of the charger can be effectively guaranteed.

The above descriptions are only preferred embodiments of the utility model patent, and do not limit the technical scope of the utility model patent. Therefore, any minor changes, equivalent changes and modifications made to the above embodiments according to the technical essence of the utility model patent still fall within the scope of the technical solutions of the utility model patent.

What is claimed is:

1. The electric vehicle charger with a retractable wire, comprising a storage box, a winding wheel and a wire, wherein one end of the wire is connected with the charger; the winding wheel is mounted in the storage box; a coil spring and a sliding ring are provided in the winding wheel; the sliding ring is provided with several conducting rings and several conducting strips that correspond and are electrically connected to the conducting rings; during use, a mains supply is connected to the conducting rings, and the wire is connected to the conducting strips; when the winding wheel is rotated, the conducting strips rotate synchronously with the winding wheel; when the conducting strips slide on outer surfaces of the conducting rings, the conducting strips and the conducting rings are kept in electric contact;

the electric vehicle charger further comprises a pull-stop structure; the pull-stop structure comprises a limiting gear arranged on the winding wheel and a latch mounted on the storage box; the latch selectively limits the limiting gear; and the limiting gear is an incomplete gear;

wherein the sliding ring comprises a stator part and a rotor part; the conducting rings are arranged at the stator part; and the conducting strips are arranged at the rotor part; the stator part is provided with a wire passing slot; and the wire passing slot is provided with an opening on an outer side for allowing the mains supply to enter;

wherein there are five conducting rings, and correspondingly, there are also five conducting strips; or, there are seven conducting rings, and correspondingly, there are also seven conducting strips.

2. The electric vehicle charger with the retractable wire according to claim 1, wherein a pair of side surfaces of the storage box are respectively correspondingly provided with a charger fetching hole and a ventilating hole.

3. The electric vehicle charger with the retractable wire according to claim 1, wherein the latch is connected to the storage box through an elastic member.

4. The electric vehicle charger with the retractable wire according to claim 3, wherein the elastic member is a spring.

5. The electric vehicle charger with the retractable wire according to claim 1, wherein a circuit board is also arranged in the storage box; and the circuit board is arranged on an upper side of the winding wheel.

6. The electric vehicle charger with the retractable wire according to claim 5, wherein the circuit board is electrically connected with a display module.

7. The electric vehicle charger with the retractable wire according to claim 5, wherein a power management module is arranged on the circuit board.

* * * * *